United States Patent [19]

Kumano et al.

[11] Patent Number: 5,193,399
[45] Date of Patent: Mar. 16, 1993

[54] VORTEX FLOWMETER

[75] Inventors: Hideo Kumano; Hideo Murakami; Masao Misumi, all of Tokyo, Japan

[73] Assignee: Oval Engineering Co., Ltd., Tokyo, Japan

[21] Appl. No.: 724,227

[22] Filed: Jul. 1, 1991

[51] Int. Cl.$^5$ .............................................. G01F 1/32
[52] U.S. Cl. .................................. 73/861.22; 73/118.2; 73/202
[58] Field of Search ................... 73/118.2, 202, 861.22, 73/861.23, 861.24

[56] References Cited

U.S. PATENT DOCUMENTS 4,448,064  5/1984  Asayama ..................... 73/861.23 X

*Primary Examiner*—Herbert Goldstein
*Attorney, Agent, or Firm*—Jordan and Hamburg

[57] ABSTRACT

A vortex flowmeter wherein a main body and a fitting plate with a by-pass are integrally formed with each other and the fitting plate placed an an outlet of a passage of small diameter and of a constant section extending from an inlet of a large diameter with a continuous contraction. The passage in the main body includes a vortex generator and a vortex sensing means for detecting a vortex produced by the vortex's generator. The by-pass line is composed of a plurality of round through-holes arranged in a circular portion of the fitting plate.

4 Claims, 2 Drawing Sheets

VORTEX FLOWMETER

BACKGROUND OF THE INVENTION

This invention relates to a vortex flowmeter and, more particularly, to a simple and accurate vortex flowmeter unit for measuring air flow for a vehicle's engine.

A vortex flowmeter to which the principle is adapted that number of vortexes produced per unit of time by a vortex generator is proportional to the flow's velocity is well known as a typical flowmeter adaptable to various kinds of fluids because of its simple design and the possibility of having a vortex generator so shaped as to maintain a constant Strouhal number over a wide range of Reynold's numbers. On the other hand, since engines for vehicles are required to be low in polluting and high in efficiency, fuel should be mixed with air at an optimum fuel-to-air ratio and, in this respect, an accurate air-flow measurement is highly required. Many kinds of flowmeters, e.g. thermal-type flowmeters and so on are adopted for this purpose. Since vortex flowmeters are capable of accurately measuring the air's flow, varying within a wide range corresponding to the working conditions of engines from the idling position to operating at high speeds, they have recently been increasingly applied to fuel systems for engines, especially to high performance engines.

A conventional vortex flowmeter for a vehicle's engine comprises a flowmeter body wherein a vortex generator and an ultrasonic transmitting-receiving element for detecting a Karman vortex street, produced by the vortex generator, are unitarily included, a flow-rectifying device for the rectification of the air's flow to be introduced into the flowmeter's body and a duct for feeding measured air into a carburetor. The flow-rectifying device, the vortex generator body and the duct are separately made and assembled into one system for actual use. The duct is connected to the flowmeter's body by means of a specially fitted plate which has an opening for passing therethrough a flow of air to the flowmeter's body, a by-pass pipe forming a by-pass flow passage and an adjusting port for maintaining a constant ratio of the bypass flow of air to the main flow of air in the flowmeter's main body.

The above-mentioned conventional vortex flowmeter unit is characterized in that its measuring range can be practically widened by providing the flowmeter with a by-pass line and a ratio of the bypass flow to the main body's flow which can be corrected to a constant value through the adjusting port provided. However, since the main body and the by-pass line differ from each other in passage shape, the drag coefficient cannot always be constant over all required ranges of the flow's measurement and therefore an accurate compensation of the flow's ratio through the adjusting port is effective only for a certain limited flow range and compensation for the other flow range is made with accuracy to a specific allowance. In the conventional vortex flowmeter it has not been possible to obtain an increase in accuracy of the flow's measurement over the full required range of measurement. A separate construction of the main body and the fitting plate requires a separate molding in respective metal molds but also requires their additional assembly. The above-mentioned drawback of the conventional vortex flowmeter could not be avoided because the by-pass pipe was integrally molded with the fitting plate.

SUMMARY OF THE INVENTION

It is an object of the present invention to provide a vortex flowmeter unit which has a vortex flowmeter body unitarily molded with its fitting plate so it can be manufactured by using less molds at reduced cost and made easy to assemble.

It is another object of the invention to provide a vortex flowmeter with high accuracy and provided with a bypass line having a number of through holes, sizes and quantity of which may be selected so as to keep constant the ratio of flow therethrough in relation to that of the main passage over the full range of the flow's measurement.

DESCRIPTION OF PREFERRED EMBODIMENTS

Figure 1:
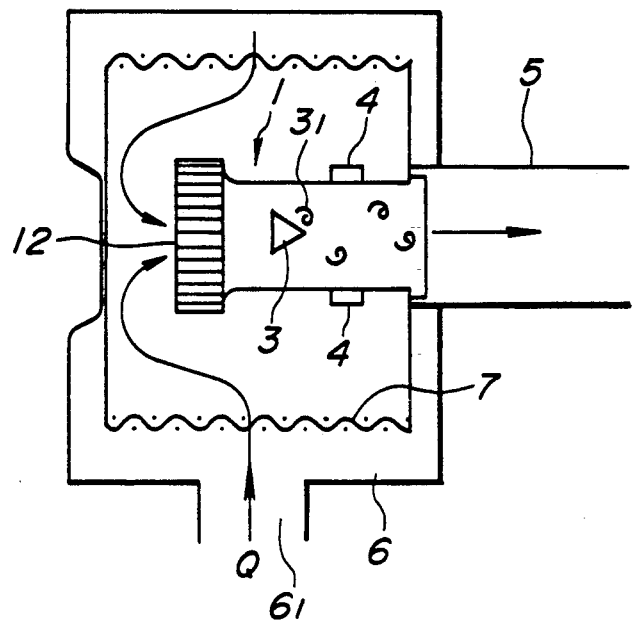
FIG. 1 is a conceptional illustration of a vortex flowmeter provided for a vehicle's engine.

FIG. 1 is a conceptional view of a vortex flowmeter for use in a vehicle's engine, wherein 1 designates the main body of a vortex flowmeter and 12 designates a honeycomb type flow-rectifying device which is made separately from the main body 1 and is inserted in a port so as to calm down the turbulence of the air's flow entering into the main body 1 of the vortex flowmeter. A vortex generator 3 produces vortexes $3_1$ and an ultrasonic transmitter-receiver 4 detects each vortex $3_1$ and sends a detection signal modulated by an ultrasonic vortex to a converter (not shown) whereby vortex signals are sensed and the flow rate calculated therefrom. A duct 5 is used for leading the measured air into the carburetor. The air to be measured comes into a case 6 through an inlet hole $6_1$ in the direction shown by the arrow Q and it is cleared of dust by an air cleaner 7 and then it flows into the main body 1 of the vortex flowmeter.

Figure 2:
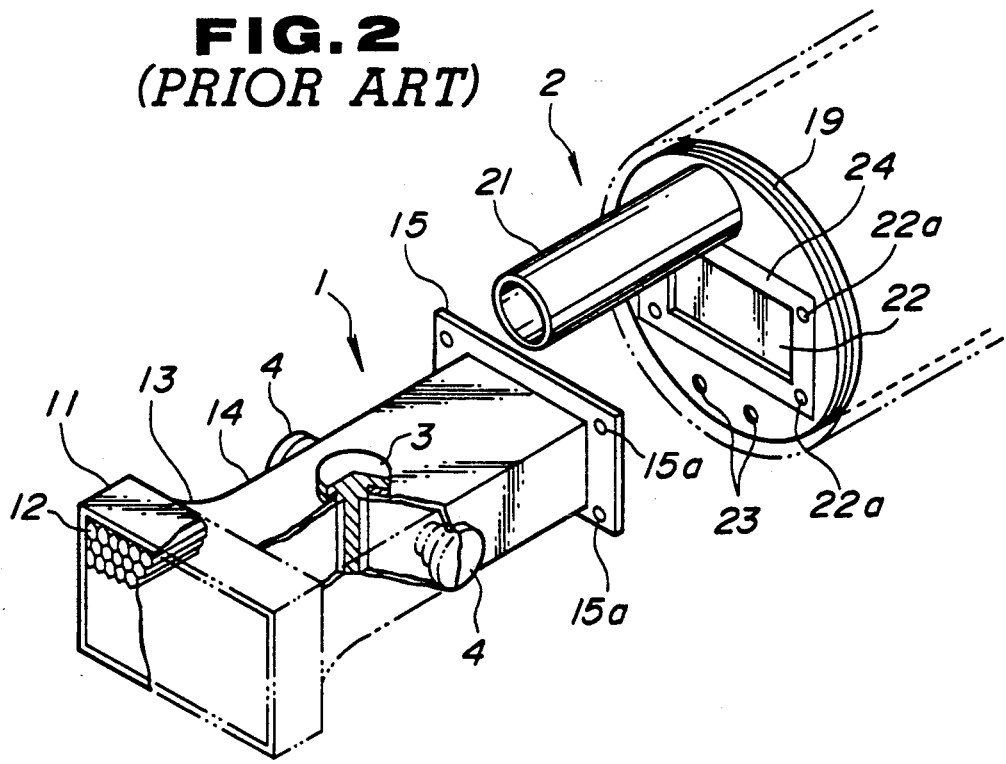
FIG. 2 is an expanded perspective view for explaining an example of a conventional vortex flowmeter unit.

FIG. 2 is a perspective view showing a vortex flowmeter unit which was previously proposed by the present applicant, wherein parts corresponding to those shown in FIG. 1 are designated by the same reference numbers and will not be explained further. In FIG. 2, numeral 11 designates an inlet of a large diameter with a flow-rectifying device 12 inserted therein whereby the flow of air is rectified and wherefrom it is contracted by a restrictor 13 in order to enter into the passage 14. The passage 14 which has a constant section substantially similar in form to the inlet which is of a large diameter 11 but smaller in size than said inlet 11 is intended to steadily lead the rectified air's flow to the vortex generator 3 wherein air vortexes are steadily produced. A flange 15 is connected to a fitting plate 2 by using screws or the like through mounting holes 15a provided therein. The above-mentioned main body 1 is integrally molded with resin together with all the components except for the vortex generator 3, the ultrasonic transmitter-receiver elements 4 and the flow-rectifying device 12. The fitting plate 2, including a by-pass line 21, is molded with resin separately from the main body 1. The fitting plate 2 has a through opening 22 of the same size as that of the passage 14 in the main body 1 and a stepped frame 24 in which the flange 15 is fitted. Mounting holes 22a in the stepped frame 24 of the fitting plate 2 are provided to coincide with the mounting holes 15a in the flange 15. Adjusting ports 23 which can be closed or opened are provided for regulating the air's flow so as to maintain a constant ratio between the by-pass flow 21 in the by-pass line 21 and the main flow in the main body 1. The above-mentioned vortex flowmeter unit, whereby the flow rate of air passing through the main body 1 is measured and air flowing through the by-pass line 21 is added to the main flow measured so as to widen the range of the flow's measurement. Furthermore, the parallel arrangement of the by-pass line 21, adapted to the engine's size makes it possible to measure a larger flow rate.

The above-mentioned vortex flowmeter unit has the feature that its flow measurement range is actually widened by attaching the by-pass line 21 and the ratio of air flow in the by-pass line 21 to that of the main body 1 and can be corrected to a specified value by using adjusting ports 23. However, since the main body 1 and the by-pass line 21 differ from each other in the section of their passages, the drag coefficient cannot be constant over the full range of the required flow measurement and therefore accurate compensation of the flow ratio through the adjusting ports is limited to a certain flow range and compensation for the other flow ranges barely attains an allowable accuracy. In the vortex flowmeter it has not been possible to obtain an increased accuracy of flow over the full range of the required flow's measurement. A separate construction of the main body 1 and the fitting plate 2 requires a separate molding process in respective molds but also requires additional assembly work. The above-mentioned drawback of the vortex flowmeter unit could not be avoided because the bypass 21 was integrally molded together with the fitting plate 2.

The present applicant has experimentally found that it is possible to make the drag coefficient of the by-pass line substantially equal to that of the main body by adopting a fitting plate having as a by-pass a plurality of small-diameter holes drilled therethrough in parallel and thereby to obtain a constant flow ratio over the required range of the flow's measurement. Furthermore, the design of the flowmeter was simplified to allow for molding the main body and the fitting plate into one unit. Namely, the present invention has as its principal object the creation of a highly accurate and inexpensive vortex flowmeter which comprises a main body having a fitting plate being provided with a by-pass and integrally formed therewith at the outlet of a passage having a constant section and a constant small diameter with continuous contraction from an inlet of a larger diameter wherein a flow-rectifying device is inserted, a vortex generator and a vortex-sensing means for detecting vortexes departing from said vortex generator, and which is characterized in that said fitting plate has a plurality of round through-holes placed parallel to each other within a circular portion thereof to form a multi-hole by-pass line.

Figure 3:
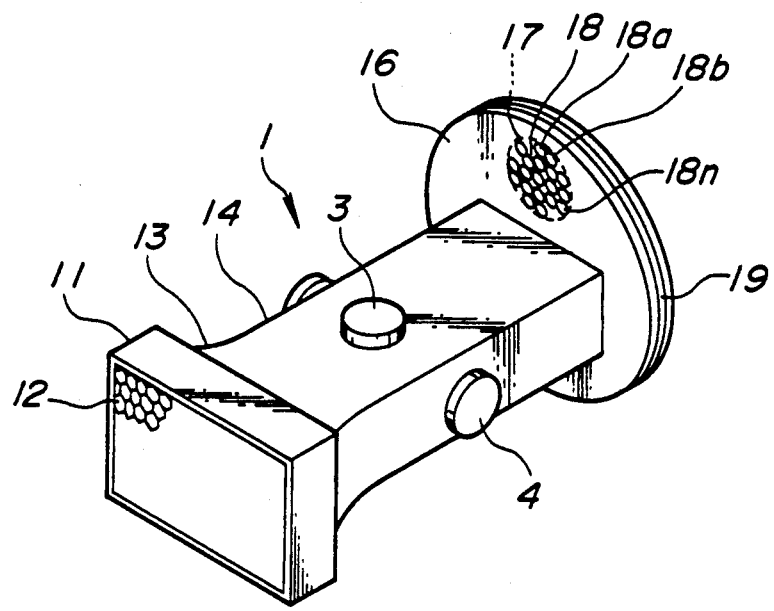
FIG. 3 is a perspective view for explaining a vortex flowmeter embodied in the present invention.

FIG. 3 is a perspective view of a vortex flowmeter according to the present invention, wherein components corresponding to those of FIG. 2 are indicated by the same reference numbers with no further explanation. In FIG. 3, a fitting plate 16 is molded integrally with the main body 1 in such a way that it forms a flange eccentrically disposed at the outlet 141 of the passage 14. Said fitting plate 16 is inserted into a duct in the same way as shown in FIG. 1. A sealing member 19, e.g. a sealing ring is fitted on the periphery of the fitting plate 16 so as to seal a gap formed round the fitting plate 16 inserted in the duct 5. The by-pass line 18 consists of a plurality of round holes of a small diameter 18a, 18b, ... 18n drilled through within a circular portion 17 of the fitting plate 16. The present applicant's experiments show that when only one round hole 18 is provided, Karman vortexes are discharged into the duct 5 through the round hole 18 at a speed corresponding to the flow rate and at the same time they cause the noisy vibrating of the fitting plate 16, but when a plurality of the round holes 18 are provided, Karman vortexes produced through the round holes 18a, 18b, ... 18n interfere with each other the to calm the vibrations down, i.e. the noise is eliminated. The results of the experiments indicate that a constant ratio of the by-pass flow in the by-pass line 21 to the main flow in the main body 1 can be maintained at every flow rate in case of $3n(n-1)+1$ (natural number $n \geq 2$), especially, $n=3$.

Figure 4:
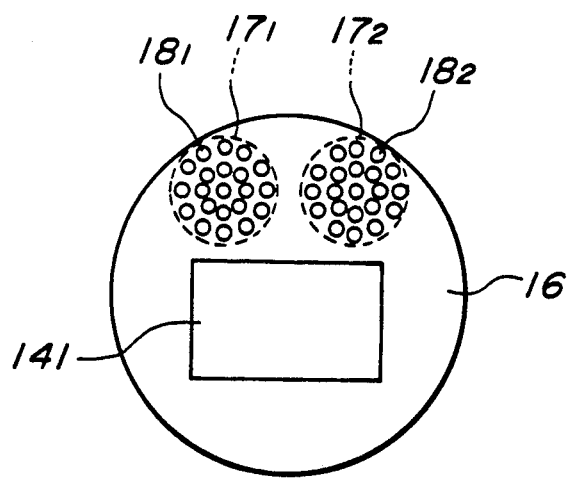
FIG. 4 is a plane view for explaining another example of a fitting plate.

In FIG. 4, a fitting plate 16, having a plurality of circular perforated portions 171, 172, is illustrated viewing the inlet side through the outlet. The more the by-pass lines, the more the by-pass flow. Although in the above-mentioned embodiment the round holes 18a, 18b ... 18n are of the same diameter, it is possible to provide round holes of different diameters because the drag coefficient may be somewhat different depending upon the shape of the vortex generator 3. In FIGS. 3 and 4, adjusting ports 23 are not shown but may also be provided since each of the round holes 18a, 18b, ... 18n are made with a machining error. It is also possible to take other countermeasures, e.g. for example by closing some of the round holes 18. Furthermore, the shape of the vortex generator and the kind of vortex sensors are not limited to those of the above-mentioned embodiment.

As is apparent from the foregoing description, according to the present invention, it is possible to provide an accurate and inexpensive vortex flowmeter since its main body and fitting plate are molded into one piece in order to cut the cost of materials, molding instruments and the manufacturing process for assembling the unit. The by-pass passage is composed of a plurality of round through-holes and the ratio of the by-pass flow to the main flow can be kept at a constant value over a large range of the flow's measurement by selecting the size and number of round holes.

We claim:

1. A vortex flowmeter unit comprising a main body having an inlet portion, a contraction portion following said inlet portion, an outlet portion following said contraction portion, and an integrally formed fitting plate following said outlet portion, said outlet portion having a substantially constant cross-sectional area, said inlet portion having a cross-sectional area greater than said cross-sectional area of said outlet portion, a flow rectifying device in said inlet portion, a vortex generator means in said outlet portion, said vortex generator means comprising a vortex generator and a vortex sensor for detecting a vortex signal from said vortex generator, said fitting plate having a cross-sectional area greater than said cross-sectional area of said outlet portion, and by-pass means on said fitting plate comprising a plurality of through holes arranged to form a generally circular section of said fitting plate.

2. A vortex flow unit according to claim 1, wherein said by-pass means comprises a plurality of said generally circular sections with each circular section having a plurality of said through holes.

3. A vortex flow unit according to claim 1, wherein said plurality of holes are circular holes.

4. A vortex flow unit according to claim 1, wherein the number (n) of through holes disposed in said circular section is equal to $3n(n-1)+1$ where (n) is a whole number which is equal to or greater than 2.

* * * * *